United States Patent [19]

Aveneau et al.

[11] 4,034,236
[45] July 5, 1977

[54] DEVICE FOR FORMING A BIPOLAR SIGNAL OF 50% DUTY CYCLE

[75] Inventors: André A. Aveneau, Clamart; Guy A. de Passoz, Lesigny, both of France

[73] Assignee: Societe Anonyme de Telecommunications, Paris, France

[22] Filed: Feb. 6, 1976

[21] Appl. No.: 655,681

[30] Foreign Application Priority Data

Feb. 14, 1975    France .................. 75.04644

[52] U.S. Cl. .................. 307/261; 307/262; 307/269; 307/247 R; 307/265; 328/34; 328/61

[51] Int. Cl.² .................. H04J 3/00; H03K 5/00; H04B 3/00

[58] Field of Search .......... 307/265, 260, 261, 262, 307/236, 247 R, 269; 328/60, 61, 34

[56] References Cited

UNITED STATES PATENTS

| | | | |
|---|---|---|---|
| 3,172,952 | 3/1965 | Lentz | 307/262 |
| 3,188,486 | 6/1965 | Favin | 307/262 |
| 3,381,088 | 4/1968 | Lentz et al. | 307/261 |

*Primary Examiner*—Stanley D. Miller, Jr.
*Attorney, Agent, or Firm*—Flynn & Frishauf

[57] ABSTRACT

The common return path of a circuit for applying pulses in alternating polarity to the balanced input transformer of a bipolar code signalling circuit is switched to block the first half and pass the last half of each pulse with a timing independent of polarity. The pulses supplied to the switched pulse-applying circuit have the same duration as the binary signal pulses from which they are derived, but these binary signal pulses are alternately supplied to the two sides of the pulse applying circuit by means of an AND-gate and a multivibrator. The same clock pulse generator times the multivibrator and the common path switching of the pulse-applying circuit. The circuit converts binary to bipolar signals free of asymmetric timing errors.

8 Claims, 6 Drawing Figures

DEVICE FOR FORMING A BIPOLAR SIGNAL OF 50% DUTY CYCLE

The invention concerns digital transmission of a data signal between terminal equipments and, more particularly, a method and a device for coding a binary data signal as a bipolar electrical signal of duty cycle ½ for output into the line.

In a system of electrical digital transmission the signal output into the line is not generally in binary form, but in a coded form satisfying various conditions imposed by the line repeaters which, notably in order to limit the errors, require a signal which is as symmetrical as possible.

One of the codes widely used in digital transmission is the bipolar code. It is a three-level code for which the bits 1 are represented alternately by a square pulse of amplitude +V (corresponding to the signal element +1) and a square pulse of amplitude −V (corresponding to the signal element −1). The binary 0 is represented by a zero voltage or absence of pulse (corresponding to the signal element 0).

As is the case in practically all transmission systems, the binary signal into the line generally has a duty cycle of ½, that is to say that whenever the binary signal to be coded is formed by a succession of binary elements of width T, the +1 and −1 elements of the bipolar signal are formed by positive and negative pulses of width T/2 respectively.

In order to form such a bipolar signal from a binary signal, one of two of the binary elements 1 must be inverted, and the width of all the binary elements 1 must be divided by two.

In the known methods the binary signal is split into two pulse trains of width T/2 corresponding to the binary signal bits 1 of even and odd order respectively, and then the pulse train so obtained are combined to form the bipolar signal.

The known devices for forming a binary signal constituted by binary elements of width T generally use at least one trigger circuit, a clock circuit generating clock pulses of period T and logical gates for forming distinct pulse trains of duty cycle ½ which are thereupon combined by means of a transformer having a centrally connected primary winding receiving one of the said pulse trains at each extremity, and the bipolar signal being collected at the terminals of the secondary winding of this transformer. A device for this type is described, for example, in the French Pat. No. 1,450,332. Another circuit of this type is described also in the French Pat. No. 2,115,685 (notably in FIG. 3). According to this Patent, the signals of opposite polarity from two trigger circuits are split by two distinct AND gates controlled by a clock signal. Another similar type of known device will be described hereinafter in reference to FIG. 1.

In these known devices the two pulse trains of duty cycle ½ derived from the binary signal follow different paths. This in general leads to asymmetry due to the asymmetry of the elements or circuits crossed along each path and resulting, on the one hand, in deformation of the real width of the positive and negative pulses of the bipolar signal and, on the other hand, in a shift of position of the pulses in relation to one another, the interval separating the middle of the successive positive and negative pulses not corresponding to an integral number of binary elements.

The present invention proposes to remedy the above-mentioned disadvantages.

This problem is solved according to the invention in that, in order to form a bipolar signal of duty cycle ½ from a binary signal, the binary signal is divided into two pulse trains comprising the even-order binary elements 1 (2, . . .2n) and of odd-order (1, . . . 2n−1) respectively, each of these pulse trains is split by means of a single clock signal in order to obtain two pulse trains of width T/2, and then these two latter pulse trains are combined to obtain the bipolar signal of duty cycle ½.

The method according to the invention is embodied in a device of the above type comprising two two-input AND gates receiving the binary signal and one of the complementary signals from a trigger circuit respectively, and so producing trains of pulses of width T, these pulse trains being applied respectively to one extremity of the transformer primary winding by the intermediary of a single switch forming respectively an AND gate with each of two transistors each receiving a pulse train of given polarity, the said switch being in the emitter circuit of each of the two transistors.

According to a preferred characteristic of the invention, the switch is formed by a transistor, the conducting period of which is situated within the conducting period of each of the two transistors.

According to the invention, the only causes of asymmetry in relative position or pulse width are due to the output transformer.

The present invention will be better understood by means of the following description of a particular embodiment given by way of example and represented in the drawings attached in which.

Figure 1:
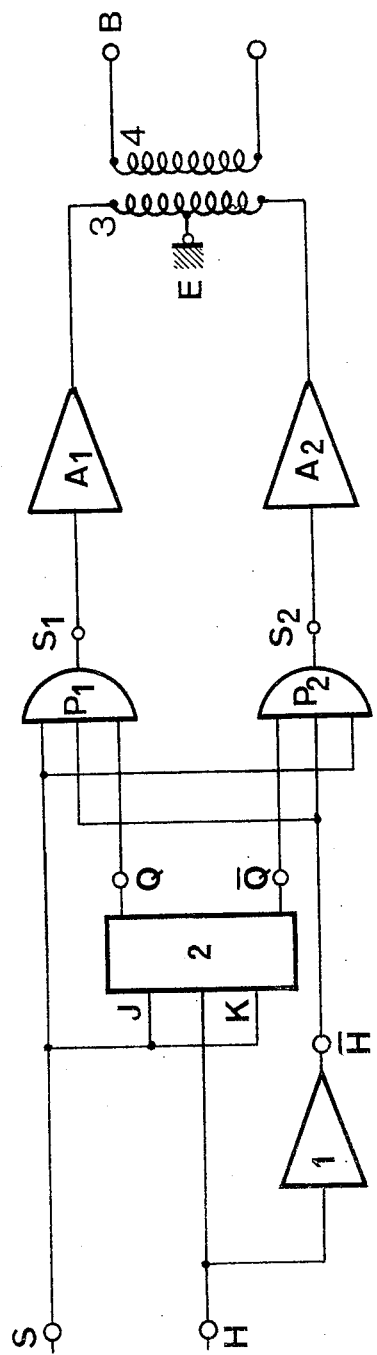
FIG. 1 is a block diagram of a known device for forming a bipolar signal of duty ratio ½ from a binary signal.

In a known device of the type represented in FIG. 1 the binary signal S is applied to the J and K terminals of a JK-type trigger also receiving the clock signal H. As will be seen from the rows H and S of FIG. 4, the period of the clock signal is equal to T and the width of a pulse corresponding to any binary element 1 or 0 is also equal to T. The binary elements 1 of this binary signal S are designated by consecutive integers from 1 to 2n. In the example given, this binary signal is limited to five binary elements 1.

Figure 4:
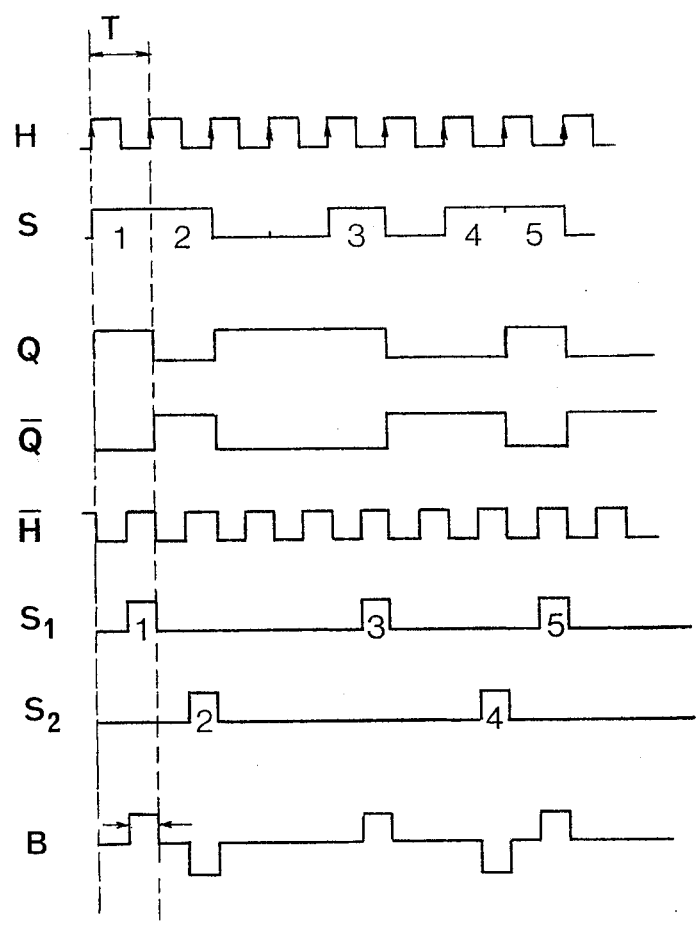
FIGS. 4 and 5 represent the signals appearing at different points of the devices shown in FIGS. 1 and 2 respectively.

The trigger 2 at its Q and $\overline{Q}$ outputs alternatively forms the signals represented in FIG. 4 and applied to one input of two logical AND gates designated as $P_1$ and $P_2$. A second input of these logical gates $P_1$ and $P_2$ receives the binary signal S, and a third input receives a clock signal $\overline{H}$ corresponding to the clock signal H inverted by the inverter 1 (see FIG. 4).

As will be seen from FIG. 4, the logical gates $P_1$ and $P_2$ combine the three input signals, namely S, $\overline{H}$, Q and S, $\overline{H}$, $\overline{Q}$, to produce respectively the signals $S_1$ and $S_2$ which are pulses of width T/2 corresponding to binary elements 1 of odd order and even order respectively of the binary signal S. These pulses are respectively transmitted by the amplifiers $A_1$ and $A_2$ to one extremity of the primary winding 3 of a transformer which has a central earthing E. The pulses $S_1$ and $S_2$ in travelling the paths $A_1$ —E and $A_2$ —E alternately cause the bipolar signal B to appear at the terminals of the secondary winding 4 of the transformer.

So in this known device the binary elements 1 of the binary signal are split at the level of the gates $P_1$ and $P_2$ to form pulse trains of duty cycle ½ which are transmitted along distinct paths to form the bipolar signal.

Figure 2:
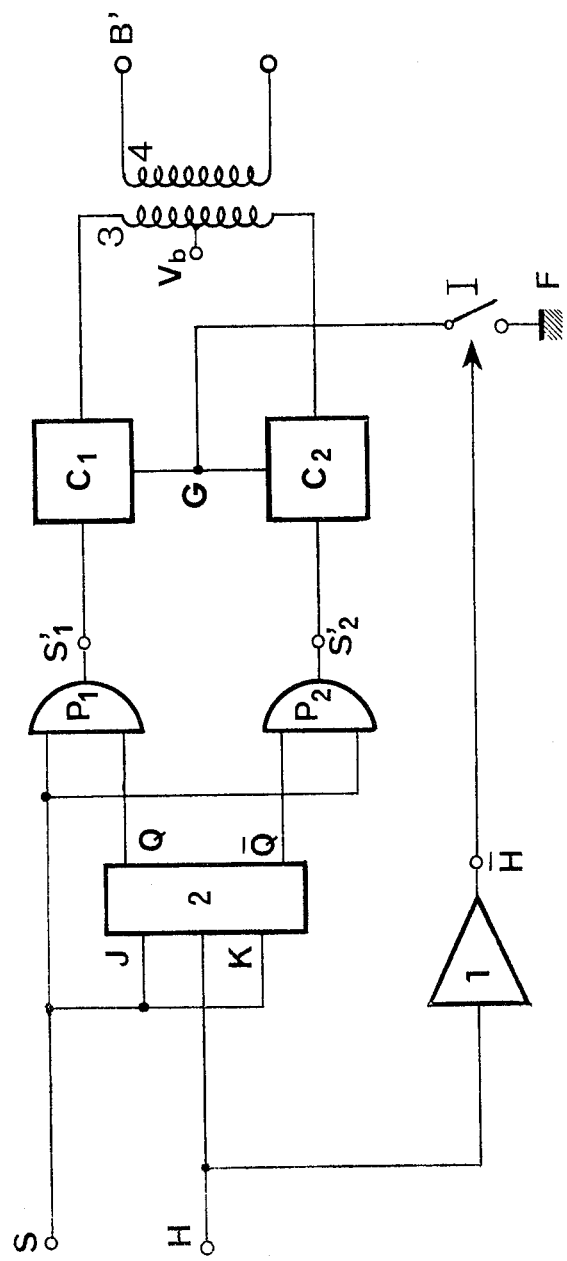
FIG. 2 is a block diagram of a device for implementation of the method according to the invention.

FIG. 2 shows a device for implementation of the method according to the invention whereby the pulse trains are split only at the level of the output transformer.

Figure 5:
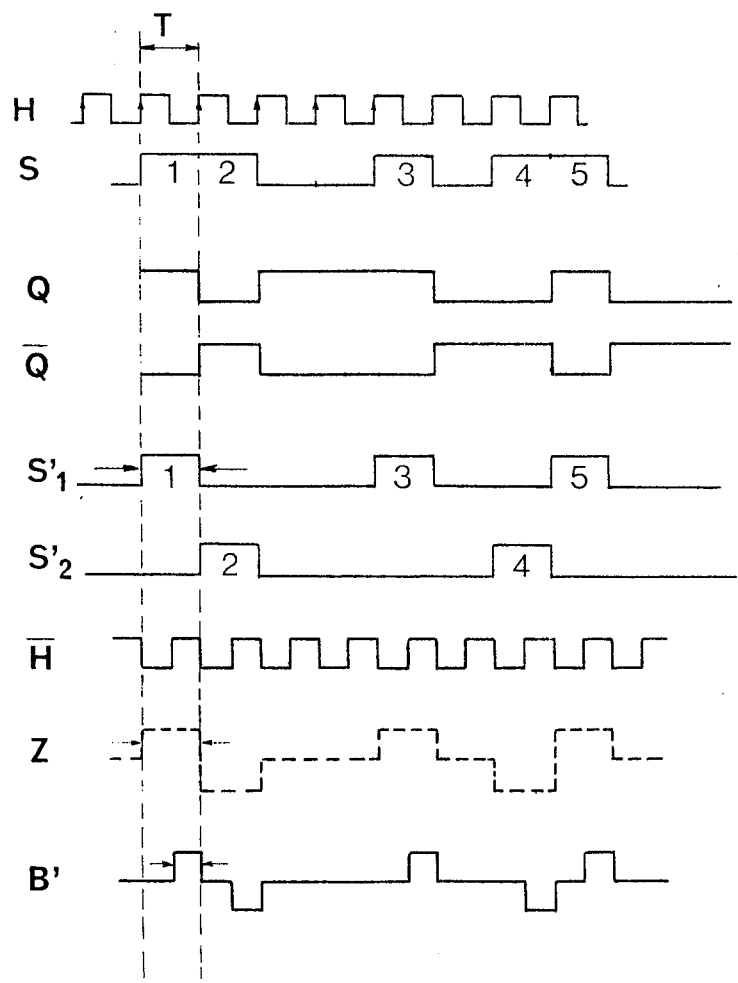

In the same fashion as in the known device, the binary signal S is applied to the inputs of a JK-type trigger receiving also a clock signal H of period T. This trigger forms complementary Q and $\overline{Q}$ signals. On the other hand, the clock signal H is also inverted in an inverter 1 to form an inverse clock signal $\overline{H}$. These various signals along with those mentioned hereinafter are represented in FIG. 5.

The complementary Q and $\overline{Q}$ signals from the trigger 2 are applied to one of the inputs of the two two-input logical AND gates $P'_1$ and $P'_2$ respectively, the second input of these gates receiving the binary signal S which is still not split by the clock signals. These gates $P'_1$ and $P'_2$ form trains of pulses of width T corresponding respectively to binary elements of odd order (1 . . .2n–1) and even order (2 . . .2n) of the binary signal S. This binary signal has therefore been separated into two trains of pulses $S'_1$ and $S'_2$, the width of which corresponds to that of one binary element of the initial signal.

The signals $S'_1$ and $S'_2$ are applied respectively to switches $C_1$ and $C_2$, controlled in common as a commutating pair, a point G by a switch 1 which is itself controlled by inverse clock signals $\overline{H}$. Each of the switches $C_1$ and $C_2$ forms a corresponding AND gate with the switch 1. In consequence the transformer primary winding 3, the central connection of which is at a fixed positive potential $V_b$, receives square pulses of width T/2 as a result of the splitting effected by the switch 1 and arriving alternatively from the commutator switches $C_1$ and $C_2$. On this basis the transformer secondary winding 4 produces a signal B' (FIG. 5) which is the desired bipolar signal.

The potential $V_b$ of the central connection of the transformer primary winding depends on the characteristics of the circuit.

In FIG. 5 the signal Z, represented by a broken line, shows the signal which would be obtained at the output of the transformer if the switch 1 were not present. It is therefore clear that the operation of forming the bipolar signal of duty cycle ½ intervenes only immediately downstream from the transformer along the common path GF, and so any difference in the behaviour of the commutators $C_1$ and $C_2$ will not affect the width of the pulses of opposite sign. Likewise there can be no difference between the propagation times of the trains of pulses of opposite sign because the splitting of the pulses takes place only immediately downstream from the transformer along the GF path.

Figure 3:
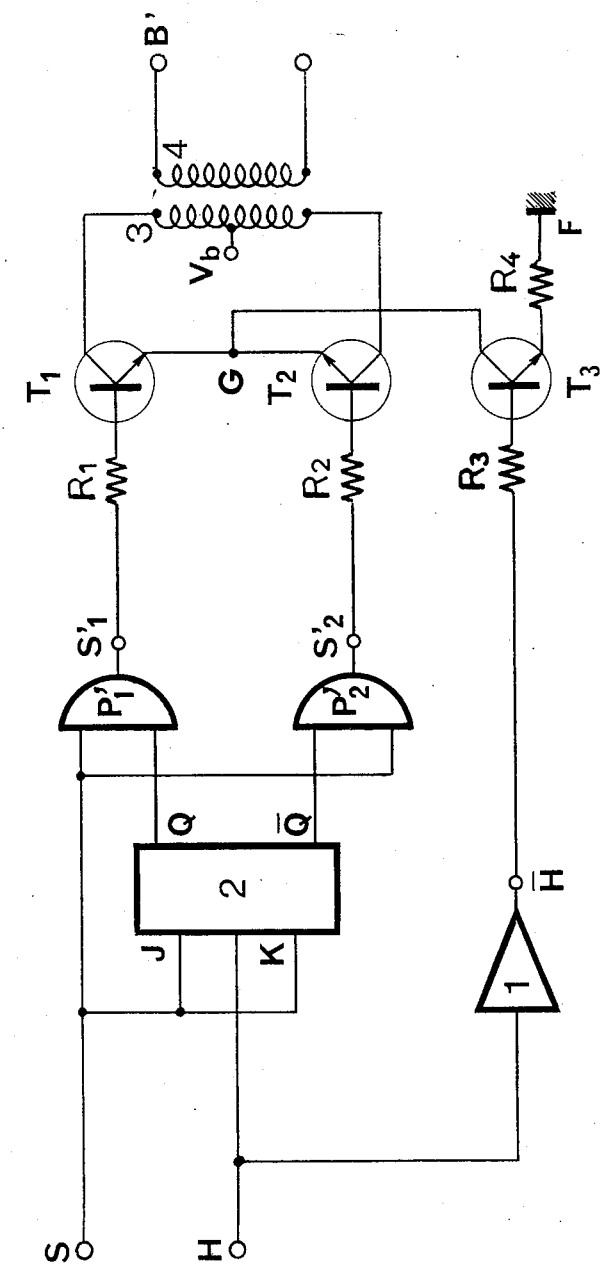
FIG. 3 is a more detailed scheme of one preferred form of embodiment of the invention.

FIG. 3 represents a preferred embodiment of the device according to the invention. The commutator switches $C_1$ and $C_2$ and also interrupter switch 1 are in the form of transistors $T_1$, $T_2$ and $T_3$ respectively. The bases of the transistors $T_1$ and $T_2$ are connected to the corresponding output of the gates $P'_1$ and $P'_2$ by the intermediary of the polization resistances $R_1$ and $R_2$. The collectors of the transistors $T_1$ and $T_2$ are connected to their corresponding end of the transformer primary winding 3. The emitters of the transistors $T_1$ and $T_2$ are interconnected and constitute the point G which is periodically earthed by the transistor $T_3$ serving as switch and having a conducting period situated within the conducting period of each of the transistors $T_1$ and $T_2$.

The transistors $T_1$ and $T_2$ are so wired that when $T_1$ is conducting, $T_2$ is non-conducting and vice versa. The transistor $T_3$ which is alternatively in series with $T_1$ and $T_2$, is associated with the polarization resistances $R_3$ and $R_4$.

A pulse from $P'_1$ or $P'_2$ can be transmitted to the transformer only if the transistors $T_1$ and $T_3$ or $T_2$ and $T_3$ are correspondingly conducting.

The base of the transistor $T_3$ is connected to the output of the inverter and therefore receives the inverse clock signal $\overline{H}$. Each positive pulse of this $\overline{H}$ signal sets the base of this transistor at a potential such that over the duration of this pulse $T_3$ and either $T_1$ or $T_2$ are simultaneously conducting in correspondence with the signals $S'_1$ and $S'_2$ applied to the bases $T_1$ and $T_2$. Hence the transistors $T_1$ and $T_3$ as well as $T_2$ and $T_3$ constitute respective AND gates receiving the corresponding singals $S'_1$ and $\overline{H}$ or $S'_2$ and $\overline{H}$. The respective coincidence of these signals leads to pulses of width T/2 which are transmitted to the ends of the transformer winding 3. So only the characteristics of the transistor $T_3$, the conducting period of which determines the width of the pulses transmitted, intervenes at the moment when each of the signals $S'_1$ and $S'_2$ is split. Hence one avoids the deformations due to the different parameters of $P'_1$ and $P'_2$ and also of $T_1$ and $T_2$, notably the build-up and fall times of the pulses in crossing $T_1$ and $T_2$. Only the characteristics of the transformer can lead to eventual asymmetry in the relative position of the pulses.

Figure 6:
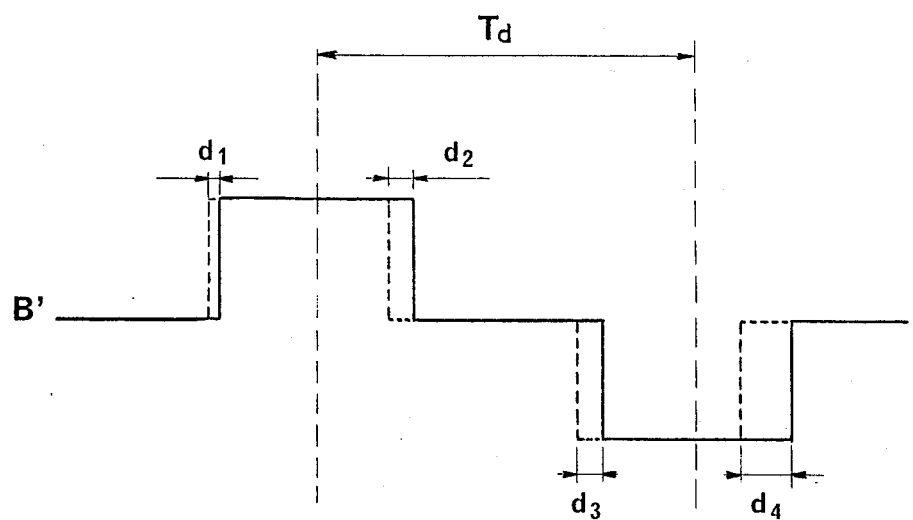
FIG. 6 shows on a larger scale the bipolar signal obtained according to the invention.

FIG. 6 shows on a much larger scale on arbitrary part of the bipolar signal B' obtained according to the invention. The deviations $d_1$, $d_2$, $d_3$ and $d_4$ represented by broken lines correspond to the eventual deformations which the pulses can experience at the time of their splitting. The common interrupter switch I or $T_3$ used according to the invention can correct these eventual deformations and so ensure that the time interval $T_d$ separating the middle of two successive positive and negative pulses corresponds to an integral multiple of the width T of the initial binary elements.

The invention thus ensures that the real width of the positive and negative pulses of the bipolar signal is identical.

The invention has a very general field of application. It is applicable notably to any digital signal of whatever frequency band and, more particularly, to any HBD 3 bipolar junction ("High Density Bipolar" code in which no sequence of more than three zero signal elements can appear), as used in digital equipment such as MIC 30 channels or a 4 × 30 channel multiplexer.

Although the duty cycle of the bipolar signal has been described as being equal to ½, this clearly refers to the periods of signal elements 1 of the binary signal, taken by themselves. In this sense, the duty cycle of the binary signal is 1. The duty cycle of the pulse train taken as a whole would of course depend upon the relative number of intervals of no current (elements 0 of the binary signal), as well as the duty cycle of the signals corresponding to elements 1 of the binary signal. It is perhaps less ambiguous, therefore, to state that the maximum duty cycle of the pulse train occurs when there is a continuous succession elements 1 in the binary signal and a minimum interpulse interval in the bipolar signal, in which case the duty cycle of the bipolar signal is ½, which will then be the maximum duty cycle of the bipolar signal pulse train as a whole, subject to being reduced in accordance with a number of expended interpulse intervals resulting from the presence of binary elements 0 in the binary signal.

We claim:

1. Apparatus for forming a bipolar signal of alternating polarity, having a duty cycle of ½ when alternating polarity signal elements succeed each other with minimum interpulse intervals, in response to a binary signal in the form of a succession of binary elements 0 and 1 of duration T, comprising, in combination:
    means for producing, at two respective outputs of said means, in response to said binary signals, two trains of pulses of duration T respectively corresponding to alternate signal elements 1 of duration T of said binary signals;
    interruptible means, having a pair of inputs respectively connected to said outputs of said pulse train producing means, for applying said two trains of pulses respectively to a pair of oppositely poled inputs of a balanced-input output coupling device, said coupling device having a common return terminal for said inputs thereof, and
    means interposed between said common return terminal and said interruptible means for interrupting the operability of said interruptible means for periods respectively corresponding to one half of the duration of each pulse of both of said trains of pulses and allowing said interruptible means to be operable for periods respectively corresponding to the other half of each of said pulses.

2. Apparatus for forming a bipolar signal as defined in claim 1, in which said interrupting means includes interruptor switch means in a common mode electrical path linking said terminal and said interruptible means, said path including a source of potential and in which, further, there are also provided clock pulse generator means of period T and duty cycle ½ having means for applying clock pulses for timing said two trains of pulses of duration T and also means for applying a set of clock pulses of duration ½ T to said interruptor switch means.

3. Apparatus for forming a bipolar signal as defined in claim 2, in which said pulse train producing means includes two AND-gate and a multivibrator, said multivibrator having a direct and an inverted output, said outputs of said multivibrator being respectively connected to an input of each of said AND-gates, said multivibrator further having a timing input connected to said clock generator means and in which, further, said interruptible means comprises a pair of transistors respectively having input electrodes connected to the outputs of said AND-gates and having their output electrodes respectively connected to said inputs of said balanced-input output coupling device and each having a third electrode, said third electrodes being connected together and to said interruptor switch means.

4. Apparatus for forming a binary signal as defined in claim 3, in which said interruptor switch means comprises a third transistor having its control electrode connected to said clock pulse generating means.

5. Apparatus for forming a binary signal as defined in claim 4, in which said balanced-input coupling device is a transformer having a center-tapped input winding.

6. Apparatus for forming a bipolar signal as defined in claim 5, in which said clock pulse generator means has two outputs both producing a square wave output of period T and duty cycle ½, said respective waves being the inverse of each other and one of them being applied to said multivibrator for timing thereof and the other being applied to said transistor constituting said interruptor switch means.

7. Apparatus for forming a bipolar signal as defined in claim 1, in which said interrupting means are means for interrupting the operability of said interruptible means for the first half of the duration of each pulse of both said trains of pulses.

8. Apparatus for forming a bipolar signal with a maximum duty cycle of one half from a binary signal in the form of a succession of binary elements 0 to 1 of width T, the binary elements of the sequence being arbitrarily referenced by means of consecutive integers (1 to 2n) the device comprising:
    a pair of two input AND gates with one input each thereof coupled in common to receive said binary signal;
    clock pulse controlled bistable means having two inputs thereof coupled in common to recieve said binary signal and two mutually inverse outputs thereof coupled respectively to the other inputs of said AND gates;
    a pair of transistor means coupled respectively to the outputs of said AND gates to receive therefrom respective trains of pulses of width T;
    bipolar coupling means having a pair of oppositely poled inputs respectively coupled to outputs of said transistor means and having a common return connection,
    clock pulse controlled switch means interposed between said common return connection and a pair of electrodes respectively of said two transistor means connected together, for controlling said transistor means in timed relationship with said bistable means so as to suppress the first half and pass the second half of pulses applied to said transistor means by said AND gates and thereby to provide a bipolar signal at the output of said coupling means.

* * * * *